(No Model.)

A. MORNINGSTAR.
NUT LOCK.

No. 328,244. Patented Oct. 13, 1885.

WITNESSES
Edwin L. Bradford
Jos. H. Hunter

INVENTOR
Andrew Morningstar
By Toulmin & Semmes,
his Attorneys

N. PETERS, Photo-Lithographer, Washington, D. C.

UNITED STATES PATENT OFFICE.

ANDREW MORNINGSTAR, OF SPRINGFIELD, OHIO, ASSIGNOR TO JOHN ALFRED DREDGE, OF SAME PLACE.

NUT-LOCK.

SPECIFICATION forming part of Letters Patent No. 328,244, dated October 13, 1885.

Application filed April 13, 1885. Serial No. 162,111. (No model.)

*To all whom it may concern:*

Be it known that I, ANDREW MORNINGSTAR, a citizen of the United States, residing at Springfield, in the county of Clark and State of Ohio, have invented certain new and useful Improvements in Nut-Locks, of which the following is a specification, reference being had therein to the accompanying drawings.

This invention relates to certain new and useful improvements in nut-locks; and it has for its objects, first, to provide against the accidental unscrewing and the consequent loosening of the parts by the employment of a ratchet-washer constructed to be connected with a fish-plate or other fixed portion of the structure to which the device is applied, and of a nut having a recessed end, the flange constituting which fits around and embraces the washer, a spring-pawl being used to connect the nut with the teeth in the washer; second, to provide a nut and permanent means of connecting the spring with the washer without the use of screws or other fastening devices.

Figure 1:
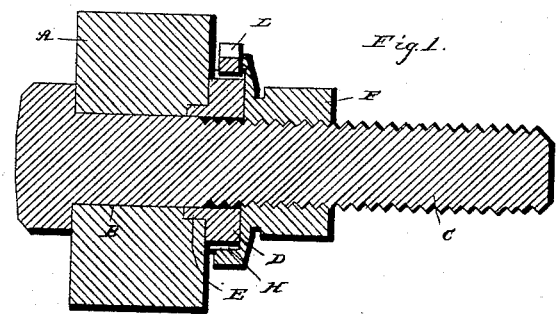
Figure 2:
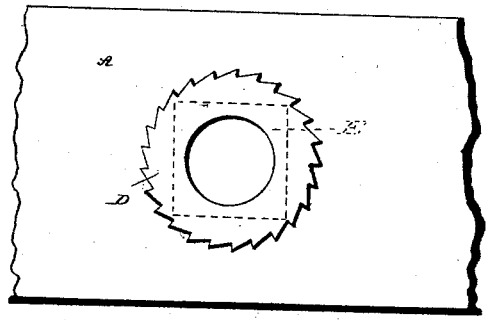
Figure 3:
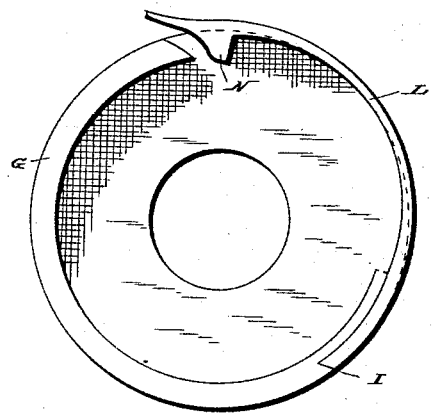
Figure 4:
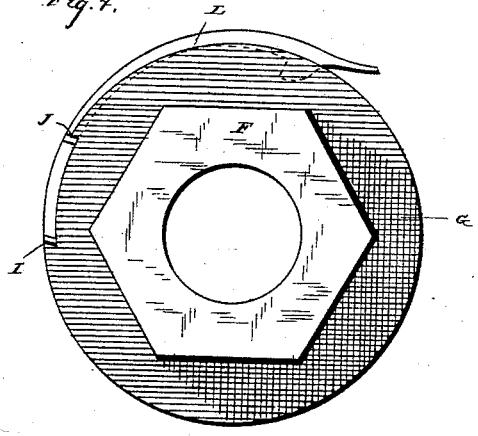

In the accompanying drawings, forming a part of this specification, and on which similar letters of reference indicate the same or corresponding features, Figure 1 represents a transverse section through a fish-plate, showing the bolt fitted thereto and the nut and washer also in section; Fig. 2, a side elevation of a portion of the fish-plate and of the washer; Fig. 3, a detached view of the nut, looking at the recessed end. Fig. 4 is an end view of the nut, and Fig. 5 a side elevation of the nut and spring.

The letter A designates the fish-plate or other structure to which the devices may be applied, and which is provided with the usual bolt-hole, B, having the end thereof adjacent to the bolt-head square, so as to receive the square shank of the bolt, and provided on the side opposite to the nut with a square or other angular enlargement of the said hole.

The letter C designates a bolt of the ordinary or any approved construction, the square shank of which fits snugly in the square portion of the hole B of the fish-plate, as above stated.

The letter D refers to the washer provided on its periphery with a series of ratchet-teeth and having a short angular boss, E, in the present instance square, extending from one side thereof and constructed to fit firmly in the correspondingly-shaped enlarged end of the hole B. This washer is also provided with a central aperture through which the bolt projects.

The letter F designates a nut screw-threaded internally to agree with the threads of the bolt and somewhat enlarged in diameter at its inner end. On a portion of the periphery of this enlarged end is formed a flange, G, which extends about two-thirds of the way around. The width of this flange is about equal to the thickness of the washer C, thereby forming a recess, H, on the inner end of the nut which completely envelops the teeth of the washer when the nut is screwed home. The flange G at one termination is recessed, so as to form a dovetail shoulder, I, and the periphery of the enlarged portion of the nut is correspondingly recessed, so as to form a dovetail shoulder, J, as more clearly seen in Fig. 4.

Figure 5:
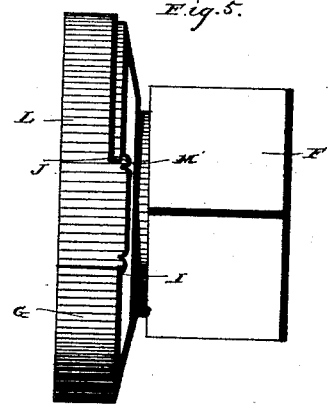

The letter L designates a spring bent into circular form and of such width as to constitute a continuation of the flange G. One end of this spring is beveled off to agree with the dovetail shoulder I, and is widened, as seen in Fig. 5, so as to form a projecting corner, M. The body of the spring, from the corner M, for a portion of its length toward the free end stands somewhat within the diameter of the enlarged portion of the nut, so as to prevent the spring from slipping outwardly and losing its position with respect to the nut. To prevent it from slipping out of the dovetail shoulders in the other direction, the beveled end and corner are struck with a pointed tool, so as to upset some of the metal against the shoulders I and J. The spring near its free end is provided with a lug, N, which slides over the teeth in the washer in the act of screwing the nut home, the spring yielding to admit of this skipping of the lug over the teeth. When, however, the nut attempts to screw or work loose, the lug engages the radial sides of the teeth in the washer and arrests it. The free end of the spring also terminates slightly above the flange, so as to admit of the introduction of a pointed tool for the purpose of springing the lug out of the teeth and allowing the nut to be unscrewed.

Having thus fully described my invention, what I claim as new, and desire to secure by Letters Patent, is—

1. In a nut-lock, the combination, with the washer having ratchet-teeth on its periphery and an angular boss extending from one side thereof, of a nut having an enlarged inner end provided with a flange, whereby a recess is constituted in the end of the nut, said portion having a recess constructed with dovetail shoulders, and a spring fitted in said recess against said shoulders, upset against the shoulders, having a lug near the other end, and terminating slightly beyond the periphery of the flange.

2. A nut constructed with an enlarged inner end having a flange formed thereon, whereby a recess is constituted in the end of the nut, and provided with a spring attached thereto at one end and having a lug near the other and terminating slightly beyond the periphery of the flange.

3. A nut having an enlarged inner end provided with a flange, the enlarged portion and the flange having a recess constructed with dovetail shoulders and a spring fitted in said recess against said shoulders and adapted to be upset against the shoulders.

In testimony whereof I affix my signature in presence of two witnesses.

ANDREW MORNINGSTAR.

Witnesses:
B. M. JACKSON,
CHASE STEWART.